United States Patent Office 3,443,136
Patented May 6, 1969

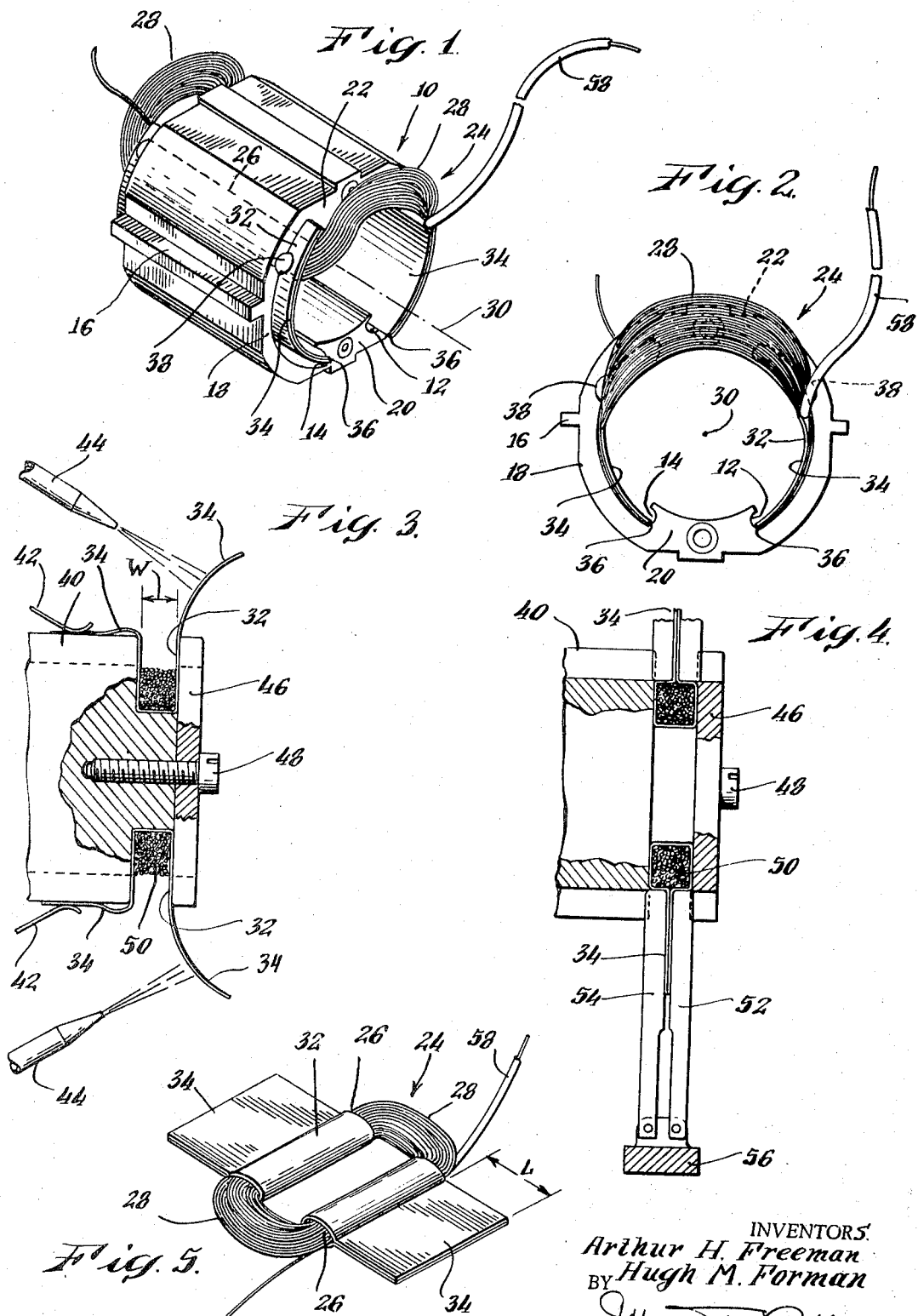

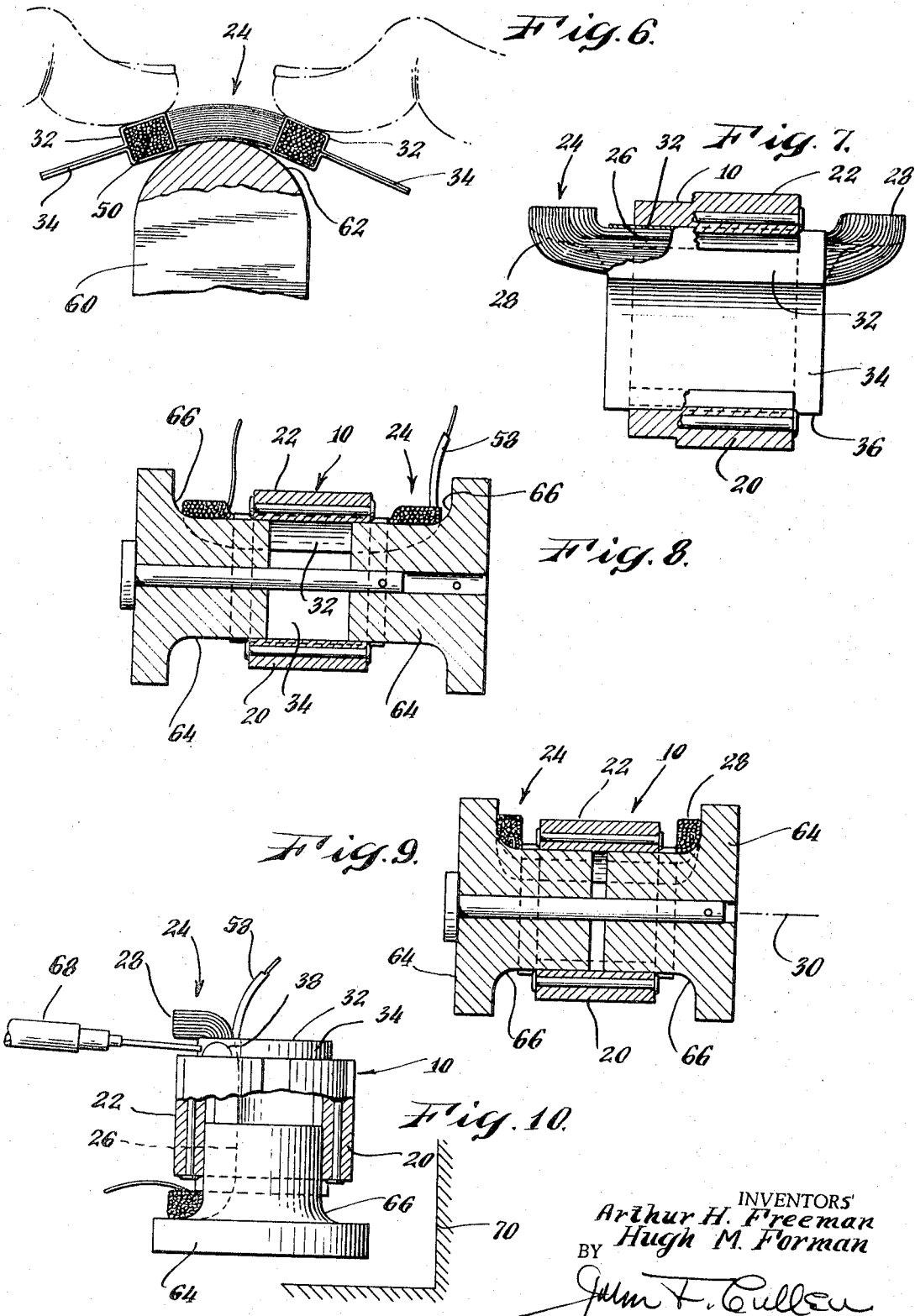

3,443,136
SINGLE FIELD COIL MOTOR STATOR AND METHOD OF MAKING THE SAME
Arthur H. Freeman, Brockport, N.Y., and Hugh M. Forman, Waukesha, Wis., assignors to General Electric Company, a corporation of New York
Filed Mar. 28, 1967, Ser. No. 626,465
Int. Cl. H02k 19/26
U.S. Cl. 310—194        6 Claims

ABSTRACT OF THE DISCLOSURE

A single field coil motor stator wherein the coil sides are provided with insulating liners with heat sealable support tabs that extend to a second field pole. After the coil is wound, the liners sealed to the coil sides, and the coil bent into an arc, the coil is inserted over one stator field pole and the end turns bent radially outward. Cement is placed between liner and stator core, and the assembly is heat cured.

BACKGROUND OF THE INVENTION

Filed of the invention

The invention herein pertains to a method of making a stator structure for a fractional horsepower electric motor and a single field coil motor produced by the method.

Description of the prior art

In small appliances it is a constant aim to produce the most compact designs possible in order to reduce the size of the various appliances. In electric operated appliances, whether battery or house current, various plastics have been used to reduce the size and it has been found possible to use a single field coil electric motor to generate the required torque. Generally such motors have employed a single field coil mounted on one end of the core resulting in a motor of comparatively large dimensions in one direction. Such a motor, in a slicing knife for example, results in a handle that is larger than desired for compactness. It is known to provide round or substantially round stator structure and fields that are wrapped around each of a pair of poles and these generally result in longer motors although reduced in height. There is no motor available in the small fractional horsepower size that is of the single field coil type and is of substantially short length and height to provide a driving means for a compact appliance.

The invention described herein is a specific improvement on the prior art in providing such a motor stator structure.

SUMMARY OF THE INVENTION

Briefly described, the present invention is directed to a method of forming and applying a motor field coil in a round stator to form an assembly which makes use of the wasted space of the air gap between the stator and armature and which consists of winding a coil on a pair of liners on a bobbin, pressing and sealing the liners in order to support the coil, removing the coil and bending it into a predetermined arc that is larger than the arc of the stator to which it is to be applied and inserting the coil into the stator slots to support it and form an assembly, the arc difference firmly holding the field coil in place in the stator; positioning the assembly on a forming fixture and bending the unsupported coil ends radially out beyond the inner stator diameter, removing the assembly, and applying a cement between the liner and stator and then heating the assembly to cure the cement and bond the coil windings together. This is the method of forming the single field coil. The invention also is directed to a stator for fractional horsepower motors as produced by such a method and which comprises a substantially round stator core with opposite longitudinal T-slots defining a pair of poles. The longitudinal walls of the slots generally conform to the stator periphery to provide a constant wall thickness between the poles. A single field coil is provided, the coil having oppositely spaced connected long and short legs with each of the long legs being disposed only in one end portion of each slot width and extending beyond the stator ends. The short legs thus extend over the pole ends. An insulating strip is provided around each long leg for support and it extends beyond the stator ends. The strip is provided with a support tab extending away from the long legs and coextensive with the remaining portion of the slot width and disposed in the slot to contact the other end portion of the slot and firmly hold the coil in place. The short legs of the coil are bent radially outward to overlay the pole ends and cement means is provided to connect the strips and stator to lock the coil in position whereby the long legs of the coil occupy the space between the motor armature and stator which is normally wasted space. Additionally, the stator requires less than half of the width of its slot for the long legs of the field coil and the insulating strip is formed of a flexible paper which is heat bonded to form the support tab. Thus, the main object of the invention is to provide a method of forming a single coil stator field structure to utilize waste space and reduce the motor size and the stator structure itself.

BRIEF DESCRIPTION OF THE DRAWING

FIG. 1 is a perspective view of the field coil and stator assembly as finally formed;
FIG. 2 is an end view of the structure shown in FIG. 1;
FIG. 3 is a partial cross-sectional view of the winding step;
FIG. 4 is a partial sectional view of the pressing and sealing of the liners;
FIG. 5 is a perspective view of the formed coil;
FIG. 6 is a partial cross-sectional view of one form of the bending step;
FIG. 7 is a cross-sectional view of the coil inserted in the stator structure to form the assembly;
FIG. 8 is a cross-sectional view of the assembly positioned on a forming fixture;
FIG. 9 is a cross-sectional view of the forming operation to bend the unsupported coil ends; and
FIG. 10 is a partial cross-sectional view showing the application of a cement to lock the parts together and also illustrating the heating and curing step.

DESCRIPTION OF THE PREFERRED EMBODIMENT

Referring first to FIG. 1, there is shown a completed assembly of a single coil stator structure whose formation will be more completely described hereafter. Generally, the stator structure comprises a substantially round stator core 10 that has oppositely disposed longitudinal T-shaped slots 12 and 14 as seen also in FIG. 2. Stator 10 may have suitable flanges 16 for cooperation with supporting structure in the appliance or housing in which the motor is assembled. Generally, the stator is formed of laminations in the well-known manner. The slots 12 and 14 generally conform to the stator periphery to provide a wall 18 of substantially constant thickness between the poles 20 and 22. In this structure there is provided a single field coil indicated broadly at 24 that is generally rectangular in form and has oppositely spaced and connected long and short legs 26 and 28 respectively as seen also in FIG. 5. The long legs 26 are disposed in the slots 12 and 14 in FIG. 1 as shown by the dotted line and the short legs 28 are disposed over the pole ends and are bent radially outward and away from the stator center line 30 to overlie two of the pole ends as seen in FIGS. 1 and 2. The coils are held in position in the stator by an insulating strip 32 that is bent around each long leg to support the leg and extends beyond the stator ends for insulation from the pole ends as shown. Each strip as best seen in FIG. 5 is formed of a sufficient peripheral length to provide a support tab 34 that extends away from the long legs as shown and fills the remainder of the slots 12 and 14. Longitudinally, the tab may be any suitable length and generally is coextensive with the strip portion around the leg. As shown in FIG. 2, the long legs of the coil only occupy a small end portion, i.e. less than half of the slot width and the remainder is occupied by the support tab which is bent within the slot to contact the other end portion of the slot at 36 and hold the single coil in place. Conveniently, the strips 32 are made of a flexible heavy paper that, when disposed as shown in FIGS. 1 and 2, tends to bow into locking supporting conformity in the stator slots. A suitable cement means, such as an epoxy 38, is provided in dabs to connect the strips in the stator to lock the coil in position. Thus, a short length and short height single field coil stator structure is provided which is compact and uses the normally waste space by having the coil conform generally to the pole-armature air gap dimensions, or the volume axially of the pole ends which is normally unoccupied space.

It will be apparent that the tab 34 need not be the full length of the stator but, for adequate support and ease of manufacture, the support tab is preferably longitudinally coextensive with the strip portion 32 that is formed around the long legs.

The method of forming and applying the motor field coil is shown in FIGS. 3–10. In FIG. 3 the coil is formed by winding a wire having an insulating and bonding coating thereon on a bobbin 40. For holding and supporting the finished coil, the bobbin carries a pair of oppositely spaced and radially extending liners or strips 32. One end of the liner or strip ends may be held by clamp 42 and one or more air jets 44 may keep the other free end of the extension or tab portion 34 open by blowing thereon. A cap 46 provides the outer end of the bobbin and is secured by any suitable means such as bolt 48 to provide an annulus wherein insulated wire 50 is fed. Generally, it is expedient to wind the coil on the bobbin in the generally rectangular form that it will take to fit the particular stator core 10 or it may be wound on a round bobbin and then pressed into the rectangular form. It is to be noted that the strip 32 is preferably commercially available flexible insulating paper that is also heat sealable and is stable with respect to heat and moisture. Generally, the liner width W in the winding structure will be greater than the width of the slot in the stator into which it will be inserted.

After the coil is formed as in FIG. 3 and before removing from the bobbin, the radially extending tab portions 34 are pressed together between heated platens 52 and 54 that may be moved into position as in FIG. 4 by any suitable means 56. Thus, by pressing together and applying heat the liners are sealed around the long legs of the coil to make the coil self-supporting.

The coil is then removed from the bobbin in a supported form of the type shown in FIG. 5. The dimensions of the liner are such that tab length L is a predetermined length for subsequent assembly steps. At this point a suitable insulating sleeve 58, as shown in FIGS. 2 and 5 may be inserted on one of the leads to extend beneath the strip 32 to isolate one end of the field coil.

It is next desired to form the coil so that it can be slid into the appropriate stator structure. To this end, the coil may be formed as shown in FIG. 6 in any suitable manner such as by hand over a die 60 by forming the arc 62 slightly larger than the inner arc of the stator slots. The coil may then be inserted by pressing into the stator 10 as shown in FIG. 7 with the larger arc, the squeezing of coil width W, and the predetermined length L causing the coil to bow into supporting conformity in the stator slots to firmly support the coil therein as seen in FIGS. 1 and 2. It is to be noted that each long coil leg may occupy considerably less than half the width of its supporting slot and the rest of the slot width is occupied by the tab 34 in the bowed position to support the coil in the overhang of the slot positively so that neither the insulated strip 32 or its supported coil can move into contact with the motor armature not shown.

The coil-stator assembly is next positioned, in FIG. 8, on a forming fixture 64 which may have a suitable curvature 66 so that the finally formed coil maintains a proper air gap with the rotating armature in the assembled motor. As shown in FIG. 9, the forming fixture 64 is then axially closed to bend the unsupported short coil ends 28 radially outward of the fixture center line 30 a sufficient amount beyond the inner stator diameter to clear the armature within the stator. Thus, the stator assembly is considerably shortened by the bending outward of the short legs 28 of the coil to occupy the normally wasted space or volume between the pole and armature at the pole ends, the coil being completely insulated from the stator.

The completely formed assembly is then removed from fixture 64 after the parts have been locked in position by the application of a dab of cement 38, such as an epoxy, by any suitable means as gun 68 as shown in FIG. 10 preferably at each end of each strip to connect the strip 32 in stator 10 and complete the assembly.

In order to fix the assembly, it is then placed in an oven, diagrammatically illustrated at 70 in FIG. 10 where a predetermined temperature, depending on the coatings on wire 50, is applied to cure the cement 38 and bond the coil windings together.

While the preferred embodiment of the actual structure and method of making it has been shown, it will be apparent that the detailed structure may be varied somewhat although generally is formed by the method described. Also, some of the method steps may be performed otherwise than as shown. For example, the bending operation of FIG. 6 may be by hand as shown or by machine but the method steps are necessary to the single coil field structure.

We claim:

1. A stator for a fractional horsepower motor comprising:
 a substantially round stator core having oppositely disposed longitudinal T-shaped slots defining a pair of poles therebetween, the longitudinal walls of the slots generally conforming to the stator periphery to define a constant wall thickness between the poles,
 a single field coil having oppositely spaced connected long and short legs,
  each said long leg being disposed only in an end portion of each slot width and extending beyond the stator ends,
  said short legs extending over the pole ends,
 an insulating strip around each long leg for support and extending beyond the stator ends,
 a support tab extending away from said long legs and coextensive with the remaining portion of the slot width and disposed therein to contact the other end portion of the slot and hold said single coil in place,
 said short legs being bent radially outward to overlay the pole ends,
 means connecting said strips and stator to lock said coil in position whereby the short legs of said coil occupy the space between the motor armature and pole ends.

2. Apparatus as in claim 1 wherein each long leg occupies less than half the width of its slot and said support tab occupies the remainder of said slot.

3. Apparatus as described in claim 1 wherein said support tab is longitudinally coextensive with the strip portion around said leg.

4. Apparatus as described in claim 1 wherein said insulating strip is a flexible paper and the connecting locking means is a dab of cement on each end of each strip connecting the strip and stator.

5. The method of forming and applying a motor field coil which consists of,
- winding a coated coil on a pair of liners on a bobbin,
- pressing and sealing the liners to support the coil,
- removing the coil and bending it into a predetermined arc,
- inserting the coil into stator slots to support it and form an assembly,
- positioning the assembly on a forming fixture and bending the unsupported coil ends radially out beyond the inner stator diameter,
- removing the assembly,
- applying a cement between the liner and stator, and
- heating the assembly to cure the cement and bond the coil windings together.

6. The method of forming and applying a motor field coil which consists of,
- holding a pair of oppositely spaced and radially extending liners on a bobbin,
- winding a coated wire coil on the bobbin over the liners,
- pressing together and applying heat to the extending portions of the liners while on the bobbin to seal them around and support the coil,
- removing the supported coil from the bobbin,
- forming the coil and liner extensions into an arc slightly larger than the stator inner arc,
- inserting the formed coil into the coil receiving slots of the stator with the larger arc causing the coil to bow into supporting conformity in the stator slots and form an assembly,
- positioning the assembly on a forming fixture and bending the unsupported coil ends radially outward of the fixture center line an amount to clear a rotating armature within the stator,
- removing the coil assembly from the fixture,
- applying a cement between the liner and stator, and
- heating the assembly to a predetermined temperature to cure the cement and bond the coil windings together.

References Cited

UNITED STATES PATENTS

| | | | |
|---|---|---|---|
| 2,038,446 | 4/1936 | Redmond | 310—194 |
| 2,265,809 | 12/1941 | Korte et al. | 310—194 |
| 3,161,796 | 12/1964 | Annis et al. | 310—215 |
| 3,378,711 | 4/1968 | Swanke | 310—260 |

WARREN E. RAY, *Primary Examiner.*

U.S. Cl. X.R.

29—596, 605, 606; 310—208, 214, 258